United States Patent Office 3,326,651
Patented June 20, 1967

3,326,651
METHOD OF AND APPARATUS FOR THE PRO-
DUCTION OF A FIRE-POLISHED GLASS STRIP
Gustave Javaux, Saint-Gilles, Belgium, assignor to
Glaverbel, Brussels, Belgium
Filed Aug. 8, 1962, Ser. No. 215,628
Claims priority, application Luxembourg, Aug. 12, 1961,
40,503
9 Claims. (Cl. 65—65)

This invention relates to a method and apparatus for the production of a fire-polished glass strip, wherein a viscous glass layer is advanced continuously in a furnace while floating on a molten bath which is of greater density than the glass and the temperature of which decreases gradually down to a value low enough for the glass strip not to be damaged by contact with conveying elements when removed from the bath.

The known processes of this kind cannot be used to provide very thin glass strips, for instance, of less than 3 millimetres in thickness, because of surface tension effects and because the glass strip must remain sufficiently coherent to advance over the molten substance.

In the process according to the invention, at least one solid element which does not stick to the viscous glass layer is moved in the direction of strip advance in contact with such layer and applies locally, over the whole width of the layer, sufficient pressure to distort the layer relative to the position it would assume by the buoyancy of the bath. There is therefore plastic flow or creep of the glass at the place where the local distortion occurs, so that the viscous glass layer is thinned and elongated. The thinning thus provided leads to a final glass strip as thin as can be provided by drawing processes but without the disadvantages thereof, namely shrinkage of the strip and aplanarities. Preferably, each of the solid members in contact with the viscous glass layer is moved more rapidly than such layer at the time when the same contacts the particular solid element concerned.

Advantageously, a number of solid elements are operative seriatim on the viscous glass layer at different places along the path of contact with the molten substance. Since the layer is elongated at each operation of such elements the rate of movement thereof must, of course, be greater in proportion as they are nearer that part of the bath where the finally shaped glass strip has become sufficiently rigid to be removed from the bath without any chance of its surface subsequently being damaged by conveying elements. The provision of a number of elements consecutively applying local pressures to a viscous glass strip experiencing the buoyancy of the bath enables the strip to advance towards the place where the finally shaped strip leaves the bath without any need to apply to the end of the solidified strip a general pull strong enough to advance the strip over the bath, for such a pull would thin the strip by its drawing action and lead to the disadvantages associated with drawing.

The temperature of the layer which moves in contact with the bath lies within limits which vary with the composition of the glass. Occasionally, it is about 1000° C. at the beginning of the treatment and occasionally about 600° C. at the termination of treatment. The plastic flow of the viscous glass and the resulting thinning of the layer are relatively high when the temperature stays between 1000 and 750° C. At about 600° C., the viscosity of the glass is considerably greater.

Preferably, local downward pressures are applied which produce distortions by plastic flow of the viscous glass layer.

The invention also relates to an apparatus for producing a fire-polished glass strip comprising a tank for a molten bath which is denser than the glass and which applies an upward thrust to a glass layer moving in contact with the molten substance, and also comprising rollers for conveying the resulting fire-polished strip once the same is cool enough to be removed from the bath by such conveying rollers. According to the invention, in such an apparatus solid elements which do not stick to the glass are so operated as to move in the direction of advance of the viscous glass layer while such members are locally in contact therewith over the whole width thereof. Moreover such elements are maintained at a height such that they deform the moving glass layer, the same tending to be moved into a stable position by the buoyancy of the bath. Advantageously, the distorting elements are formed by motor-driven rollers.

Another feature of the apparatus according to the invention is that the rollers co-operate with a solid member which is disposed on the other side of the glass layer at a distance from the respective roller less than the thickness of the layer engaging with the solid member, thus providing rolling of such layer by the local reaction on it.

The invention also relates to a method of conveying a fire-polished glass strip in which the same slides continuously in a molten bath which is denser than the glass and the temperature of which decreases to a value low enough for the strip to leave the bath without any chance of its surface being subsequently damaged by contact with conveying rollers disposed after the bath. The object is to enable the glass strip to be advanced over the molten bath, but without being drawn, by a pull applied to the strip part which has already left the bath. According to the invention, driving rollers engage with the top surface of the strip part in engagement with the molten bath with just enough force to move such strip part without thinning the same. Consequently, in the region where the strip experiences the driving force, the pressure between the strip and the driving rollers applied to its top surface is less than if the strip were free to rest with all its weight on driving rollers. Since the pressure between the strip and the driving rollers applied to its top face is a result of the increase in the volume of immersed glass and of the difference between the density of the molten substance and the density of the glass, the pressure can readily be limited to the amount required to drive the strip part in contact with the bath.

It is known to fire-polish a glass strip moving continuously on a bath of a molten metal or alloy which oxidizes in air when its temperature is above the temperature at which the shaped strip can be removed from the bath without being damaged by elements conveying the strip in an annealing tunnel. In this case a non-oxidizing atmosphere must be maintained above the bath. This non-oxidizing atmosphere can be omitted if a molten bath is used which is unaffected by air at the working temperature or if the molten metal bath is covered with a layer of molten substance which is less dense than the glass and which is unaffected by air at the working temperatures.

In an advantageous variant, the glass strip is dipped into the molten substance by means of driving rollers until the strip top surface is below the exposed surface of the molten bath. This helps to reduce the coefficient of friction between, on the one hand, the driving rollers and, on the other hand, the glass by the provision of an intermediate layer of molten substance, so that if for some accidental reason one of the rollers does not rotate exactly at the required speed, the resultant disturbance to the driving of the strip is less than if the coefficient of friction were higher.

Similar advantages are provided if the glass strip is dipped into the denser-than glass bath to an extent such that a part of the strip remains out of the bath and if the bath is covered with a layer of a substance which is less dense than the glass and which is unaffected by air at the working temperatures, to a level above the top of the strip part sliding on the bath below it.

If a layer of a non-oxidizing molten substance, such as a layer of molten salts or mixture of salts, is used above the dense bath, and if the rollers which advance the glass strip dip into such layer, such rollers are also protected against oxidation by being covered with a layer of salts. This is particularly useful in the case of carbon rollers.

Various embodiments of apparatus according to the invention are illustrated diagrammatically and solely by way of example in the accompanying drawings wherein.

Figure 1:
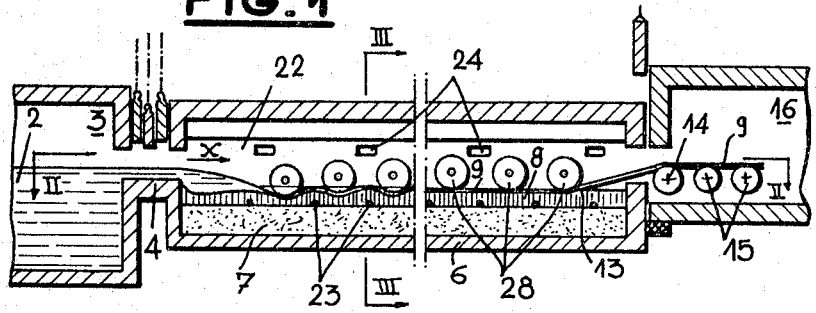
FIG. 1 is a vertical longitudinal section, taken along the line I—I of FIG. 2, through an apparatus for producing a fire-polished glass strip.
Figure 10:
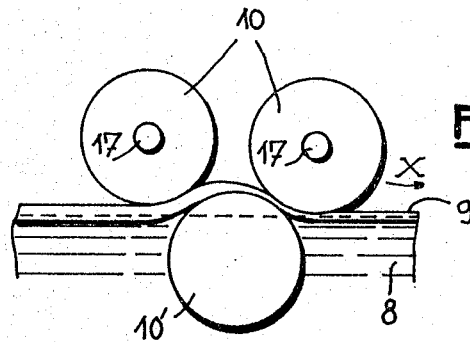
Figure 11:
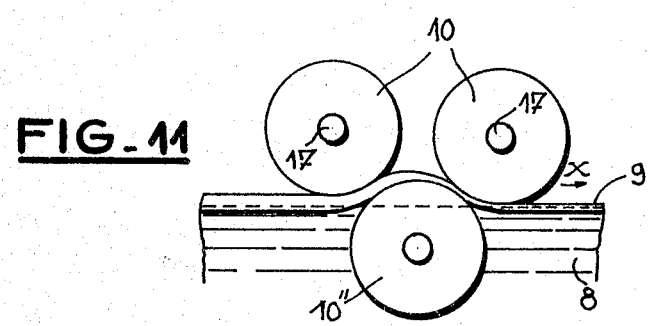
Figure 12:
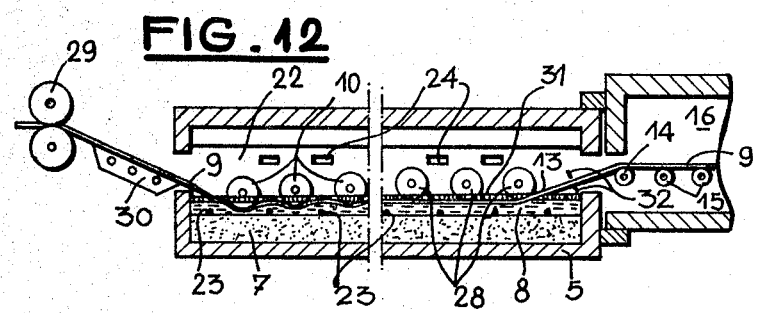
Figure 13:
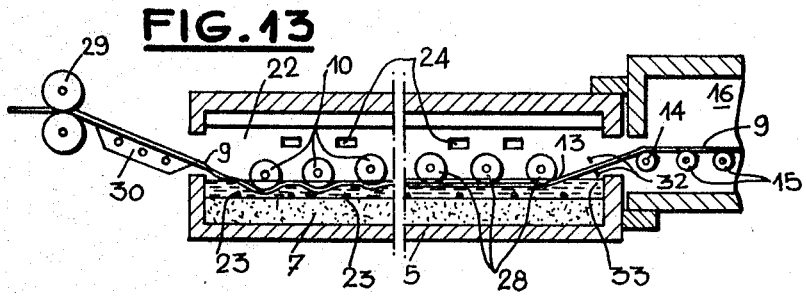

FIGS. 4-11 diagrammatically illustrate various possible means for thinning and driving a viscous glass layer, and FIGS. 12 and 13 are longitudinal vertical sectional views similar to the view shown in FIG. 1 but of two alternative forms of the apparatus according to the invention.

Throughout the drawings like references denote like elements.

Figure 2:
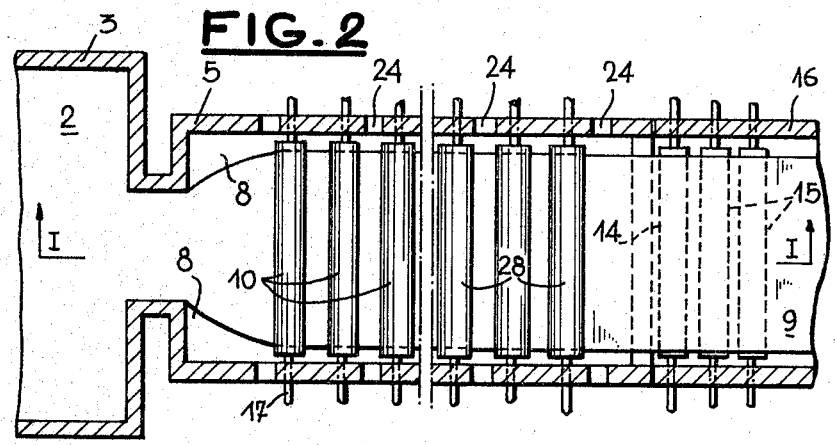
FIG. 2 is a horizontally sectioned plan view taken along the line II—II of FIG. 1.

Referring to FIGS. 1 and 2, glass 2 in the refining area 3 of a furnace spills over a threshold 4 thereof and spreads into a tank 5 having a base 6 which bears a refractory layer 7 covered by a layer 8 of a molten metal which oxidizes in air and which is denser than the glass. The glass which overflows in this way thins out rapidly as it moves in the direction indicated by an arrow X parallel with the tank longitudinal axis and as it spreads out laterally. The tank part adjacent the refining area 3 is therefore the equivalent of a device for shaping a glass strip 9.

When the viscous glass strip has spread out laterally to the extent permitted by its surface tension, it is thinned while moving in the direction of arrow X by solid elements which move in the same direction while in contact with the top surface of the glass layer over the whole width thereof, which elements do not stick to the glass. Advantageously, the solid elements are formed by rotating carbon rollers 10 individually driven by a motor 11 (FIG. 3) through a variable-speed device 12. To simplify FIG. 2, the motors 11 and variable-speed device 12 are not shown therein.

Each rotating roller 10 can be adjusted in height so as to take up a position in which it distorts the glass layer by urging the same downwards from its stable position floating on the molten metal when the weight of the glass strip is in equilibrium with the buoyancy of the molten metal in which the strip dips. Each roller applies over the whole width of the glass strip a local pressure which helps to thin and elongate the layer because of the deflection it experiences. Preferably, each roller runs at a peripheral speed greater than the speed at which the viscous glass layer is moving at the time when such layer enters into engagement with the particular roller concerned, to facilitate the removal of the elongating glass strip. The consecutive distorting rollers 10 rotate at speeds which are greater in proportion as the rollers are nearer the zone 13 where the finally shaped glass strip leaves the surface of the bath 8 after having cooled sufficiently not to have its surface damaged by contact with a bending roller 14 and conveying rollers 15 disposed at the entry of an annealing tunnel 16.

The glass gradually cools in contact with the bath 8 and becomes increasingly viscous as it approaches zone 13. Advantageously, therefore, the rollers 10 which are nearest the entry of the tank 5 provide the greatest deformation of the glass strip. As can be seen in FIG. 1, the bottom generatrices of the rollers 10 are at distances from the top of the bath 8 which decrease in proportion as the rollers 10 are nearer the zone 13. Conveniently, to ensure that the thinning of the glass layer is performed satisfactorily, the bearings of the rollers 10 are provided with weighting systems (not shown) to facilitate the adjustment and indication of the pressure applied by each roller to the glass layer.

Figure 3:
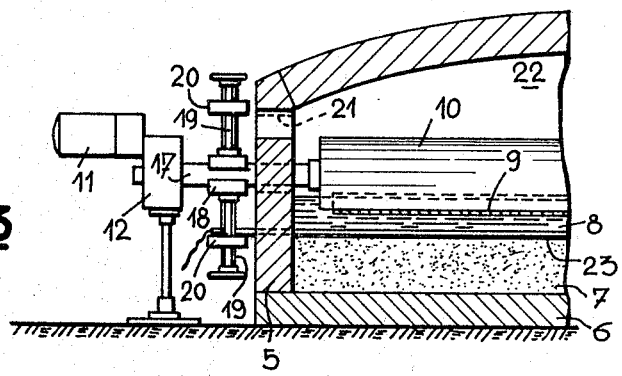
FIG. 3 is a cross-section to an enlarged scale, and taken along the line III—III of FIG. 1, of one half of the furnace.

Referring to FIG. 3, the shafts 17 of the rollers 10 are disposed above the top of the bath in bearings 18, the height of which can be adjusted by operating screws 19 in stationary parts 20. The shafts 17 engage in apertures 21, the height of which is greater than the diameter of the rollers in order that the same may be introduced and positioned at the level best suited to the thickness of the glass layer and to the amount of penetration thereof in the molten metal bath 8. The apertures 21 are closed while the apparatus is in operation.

The temperature of the glass layer during its movement towards zone 13 is governed by the temperature of the bath 8 and by the temperature of the atmosphere 22 thereabove. The temperature of the glass layer can be controlled by elecric resistances 23 disposed in the molten metal and by the provision of burners (not shown) in apertures 24. The atmosphere 22 is a non-oxidizing atmosphere which prevents oxidation of the oxidizable metal bath 8 and of the carbon rollers.

Figure 4:
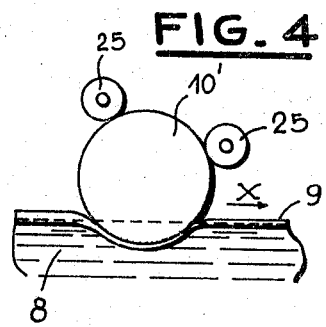

The local pressure producing creep of the glass in the viscous glass layer can be provided by a carbon roller 10' which can be seen in FIG. 4 and which has no driving shaft but is rotated by small rollers 25 operative on two ends of its periphery. The rollers 25 also provide a heightwise location of the roller 10' which experiences the buoyancy of the bath.

Figure 5:
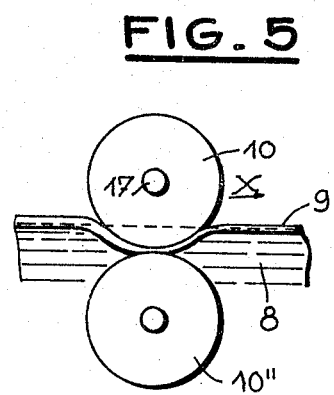

If required, the glass layer can be thinned by being rolled, for instance, as shown in FIG. 5, between a vertically displaceable roller 10 and a vertically non-displaceable roller 10". Alternately, the glass strip can be rolled between a vertically movable roller 10 and a solid metal base 26 which can be seen in FIG. 6 and which, instead of being horizontal as shown therein, can be inclined as shown in FIG. 7.

Figure 8:
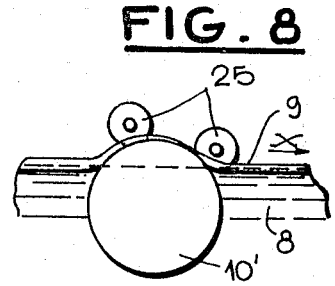

Referring to FIG. 8, the viscous glass layer is thinned by being raised locally above the level of the bath on which the strip floats, the raising being effected by means of a carbon roller 10' which is driven and located in height by rollers 25 operative on its periphery.

Figure 9:
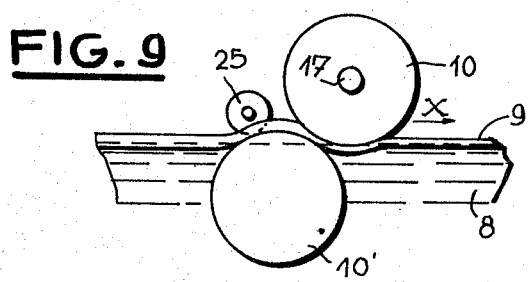

In FIG. 9 the glass strip is advanced by being driven by a shaftless carbon roller 10' which is rotated by driving rollers 25 operative on its ends and by a rotating roller 10. The same therefore provides rolling and plastic flow of the strip by dipping below the level of the bath. The amount by which the glass strip 9 is raised depends upon the positions of the rollers 25 and 10.

In FIG. 10, a pair of rollers 10 each associated with a vertically adjustable driving shaft 17 maintain a shaftless roller 10' below the level at which it would be if it were free to be raised by the buoyancy of the bath 8. In FIG. 11, the roller 10" is a stationary roller.

Since the viscosity of the glass increases considerably when the temperature decreases, the plastic flow effect becomes negligible when the shaped glass strip is sufficiently near the zone 13. There is therefore a temperature at which the rollers pressing the shaped glass strip do nothing more than advance the strip as it cools down to the temperature at which it can leave the bath without detriment. This conveyance can be provided by reducing the local pressure to a value just sufficient to move the strip along.

In FIGS. 1 and 2 three rollers 28 are shown as moving the glass strip 9 over the bath 8 in such conditions, without the aid of the pull applied by the rollers 15 in the annealing tunnel 16. The latter pull can therefore be limited to the amount required to lift the strip from the zone 13, and there is no pulling of the strip while the same passes between consecutive rollers 28. Advantageously, the various rollers 28 are mounted and driven similarly to the rollers 10. Adjustment of the vertical position of the rollers 28 can therefore be achieved readily so as not to upset the level of the glass strip between two consecutive rollers 28 in the light of the viscosity of the glass between such consecutive rollers.

This form of conveyance over a molten bath can be used, whatever the way in which the strip has been shaped. In particular, there is no need for the strip to have been shaped on such bath nor to have previously been given thinning by creep.

Referring now to FIG. 12, a rolling stand 29 delivers a glass strip of uneven thickness. The thickness cannot go below 4 millimetres because of the glass solidifying when in contact with the cooled rollers of the rolling stand 29. The strip 9 slides over an inclined and cooled table 30. Upon leaving the table, the strip dips into a molten salt or molten mixture of salts 31, covering the metal bath 8 which oxidizes in air and in which the glass strip is dipped by carbon rollers 10. The temperature through the glass strip becomes uniform as a result of heating in the hot bath by electric resistances 23 and by burners in the apertures 24.

The strip obtained after creep is of an even thickness less than the mean thickness of the strip issuing from the rolling stand when it reaches the zone 13. Fibre-glass scrapers 32 which have a higher melting point than the glass forming the strip remove the salt covering the strip 9 before the strip passes to the bending roller 14.

In this embodiment, there is no need to provide a non-oxidizing atmosphere 22, for the molten salt or molten salt mixture 31, for instance, a mixture of alkaline halogenated salts and alkaline-earth halogenated salts, protects the oxidizing metal bath 8 and the carbon rollers 10 and 28 against oxidation, the rollers being covered with a layer of molten salts as they rotate.

The apparatus illustrated in FIG. 13 is similar to the apparatus illustrated in FIG. 12 except that the molten bath 33 is formed by a salt or a mixture of salts, such as alkaline halogenated salts and alkaline-earth halogenated salts, denser than the glass. The strip 9 is maintained continuously immersed to prevent the carbon of the rollers 10 and 28 from oxidizing. Such rollers are therefore covered by a protective layer of salt as they leave the bath 33.

Figure 6:
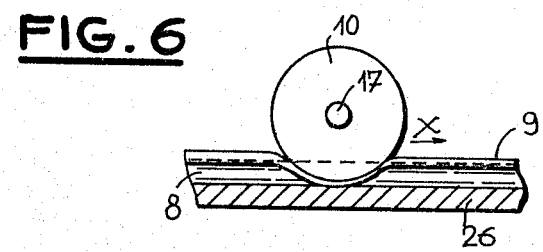
Figure 7:
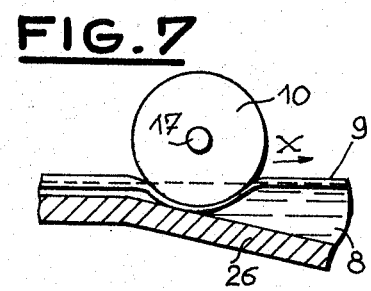

Advantageously, the refractory tank base 7 illustrated in FIGS. 1, 3, 12 and 13 is covered by a solid flat metal base which can act as the base 26 in FIGS. 6 and 7 for one or more rollers 10. A flat solid metal base facilitates replacement of the electric resistances 23, since the latter can be disposed below the base 26 instead of in the molten bath.

Of course, the invention is not exclusively limited to the embodiments illustrated, and many modifications are possible to the form, arrangement and constitution of some of the elements used to embody the invention without departing from the scope thereof, provided that such modifications are within the coverage of the following claims.

What I claim is:

1. A process for the manufacture of a fire-polished glass strip, comprising forming a continuous strip of glass, melting in a tank a substance which is of greater density than the glass and which is inert with respect to the glass and with the material of the tank at the working temperatures, driving said continuous strip longitudinally on the molten substance by applying to the glass strip in contact with the molten substance at several locations at which the glass strip is flowable, the pressure of horizontal rotating driving rollers over the entire width of said strip to thereby thin said strip, said rollers being non-adherent with the glass and having their axes extending in planes perpendicular to the longitudinal axis of the strip, maintaining the temperature of a part of said bath and of the atmosphere above it at a value producing fire polish on the glass, cooling said bath and said atmosphere in the direction of movement of the strip until the surface of the strip is sufficiently solidified and can be engaged without damage to the surface of the strip, and mechanically conveying the thus cooled glass strip by engaging the strip after the same has left the bath.

2. A process as claimed in claim 1 wherein the glass strip is locally distorted by said rotating driving rollers relative to the position the glass strip would occupy under the buoyancy of the bath if the strip were free to occupy this position, and rotating each of said driving rollers at a specific peripheral speed such that this speed is greater than the speed of said glass strip at the moment when the latter comes into contact with the particular rotating driving roller.

3. The process claimed in claim 2 wherein the said rotating driving rollers are applied against the top surface of said strip.

4. The process claimed in claim 2 wherein the said rotating driving rollers are applied against the bottom surface of said strip to locally lift the strip.

5. The process claimed in claim 2 comprising squeezing the glass strip between at least one rotating driving roller and a solid member in contact with the surface of the strip over the entire width of said strip.

6. The process as claimed in claim 1 wherein the material of the bath is an oxidizable metallic substance and the process further comprises covering said metallic bath with a layer of molten substance which is inert with respect to air at the working temperatures.

7. Apparatus for manufacturing a fire-polished glass strip, comprising a furnace for melting glass, a tank containing a molten substance which is of greater density than glass and which is inert with respect to the glass and with the material of the tank, means forming a continuous strip of glass extending from the furnace and on said molten substance, means regulating both the temperature of said bath in a zone near the entry of the tank and the temperature of the atmosphere above said bath at a value sufficient for fire polishing the glass strip, means cooling the bath and the surrounding atmosphere towards the exit of the tank sufficiently to cool and solidify the glass strip until the surface of the latter can be mechanically engaged free from damage, mechanical conveying means located beyond the exit of the tank engaging and conveying the thus cooled glass strip after the same has left the tank, a plurality of horizontal rotatable driving rollers which are non-adherent to the glass, said rollers being supported in said tank at locations at which the glass is flowable and extending across the entire width thereof to engage and locally distort the glass strip over its entire width where the rollers are in contact with said molten substance, said rotating rollers being supported with their axes extending in planes perpendicular to the longitudinal axis of the strip, means for rotating the rollers in the direction of movement of the strip to drive and thin said strip, means for independently adjusting the speed of said rotating rollers, and means for independently adjusting the height of said rotating rollers.

8. Apparatus as claimed in claim 7 comprising a solid member adjacent at least one rotating roller, and spaced a distance therefrom which is less than the thickness of the glass strip which must pass between them, said solid member extending at least on the entire width of said strip.

9. Apparatus as claimed in claim 8 wherein the bottom of the tank is metallic and constitutes said solid member.

References Cited

UNITED STATES PATENTS

| 547,630 | 10/1895 | Davidson | 65—256 |
| 1,564,240 | 12/1925 | Hitchcock | 65—182 |
| 2,968,892 | 1/1961 | Pilkington | 65—182 |
| 3,083,551 | 4/1963 | Pilkington | 65—182 |
| 3,218,141 | 11/1965 | Lambert | 65—182 |
| 3,250,604 | 5/1966 | Toytot et al. | 65—182 |

DONALL H. SYLVESTER, *Primary Examiner.*

D. CRUPAIN, G. R. MYERS, *Assistant Examiners.*